Feb. 7, 1933.                M. ESNARD                 1,896,944
                              FAUCET
                         Filed April 28, 1932
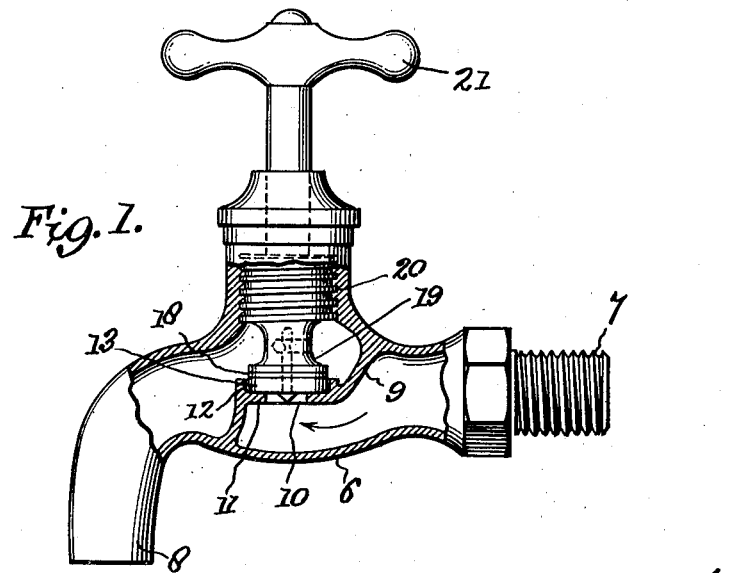
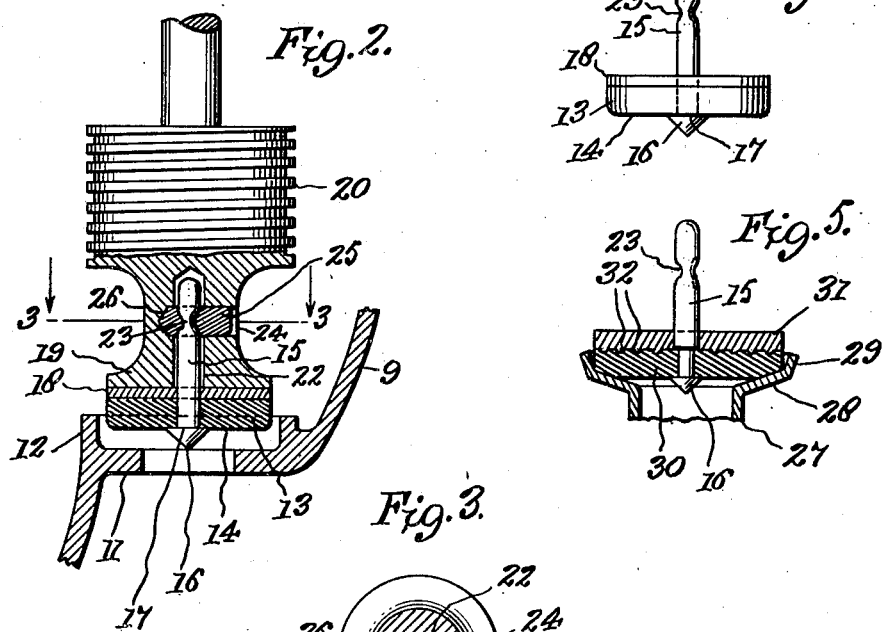
Inventor.
M. Esnard
Wilkinson & Mawhinney
Attorneys.

Patented Feb. 7, 1933

1,896,944

UNITED STATES PATENT OFFICE

MIGUEL ESNARD, OF MATANZAS, CUBA

FAUCET

Application filed April 28, 1932. Serial No. 608,103.

The present invention relates to improvements in faucets, and has for an object to provide certain improvements in my similarly titled co-pending application filed June 8, 1931, Serial No. 543,138.

An object of the invention is to provide an improved faucet in which a direct pressure may be imposed upon the compressible washer, which fits against the valve seat without requiring the rotation of the washer upon the valve seat, and at the same time, so constructing and arranging the washer and valve seat, that the washer will be compressed peripherally, thus avoiding the accidental blowing out of the washer at night, or at other times when it is inconvenient to have to change and renew the same.

The invention has for another object to provide an improved construction, which will cause the prompt renewal of a worn valve washer. When wear occurs in the washer, the threads of the tap are seriously threatened. Negligence in attending to the renewal of washers oftentimes occasions the greater expense of renewing the entire tap, or faucet, which parts are very expensive.

The present invention aims to reduce and eliminate the necessity for such extraordinary expense by providing a faucet, which will leak voluminously when the valve washer is worn, thus calling attention to the need of repair and renewal.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side view with parts broken away showing an improved faucet constructed according to the present invention.

Figure 2 is a vertical section taken on an enlarged scale, and showing parts of the valve and valve seat with the valve in the open position.

Figure 3 is a horizontal section taken along the line 3—3 in Figure 2.

Figure 4 is a side elevation of the valve shown apart from the other parts of the faucet, and Figure 5 is a fragmentary vertical section showing a modification.

Referring more particularly to the drawing, 6 designates the shell or casing of the usual faucet, having the nipple 7 by which it is screwed into the water connection, and having the spout 8.

Interiorly, the faucet is provided with a diaphragm 9 having therethrough a passage or opening 10 surrounded by a valve seat 11. This valve seat is in the form of a substantially horizontal ledge, and extending upwardly therefrom, at its outer edge, is an upstanding flange or shoulder 12, which may be of approximately the depth or thickness of the compressible washer 13, which forms part of the valve assembly. This washer 13 may be of rubber, rubber composition, or other suitable material of which washers are ordinarily made. The washer is of a diameter to fit with slight play into the flange 12. In its central part the washer is formed with a small opening 14 adapted to snugly embrace the valve stem 15, which valve stem carries upon its lower end a spear, wedge, or other head 16. This head preferably comes to a point below, has an outwardly flaring outer wall, and is formed with an inverted wide base 17 constituting an annular shoulder against which the washer 13 engages.

This shoulder 17 acts to confine the washer in place and the washer may be either slipped over the upper end of the stem 15 or forced over the flaring or conical wall of the head 16, in which case the rubber of the washer will spread about the opening 14 to permit the passage of the washer over the head 16, and will thereafter promptly contract due to its inherent resiliency, causing the wall of the opening 14 to grip tightly upon the valve stem 15, and the lower face of the washer 13 to engage the annular shoulder 17.

Above the washer 13 is a plate 18. This may be of relatively thin metal. The plate acts as a backing for the compressible soft washer 13, and it also acts in the capacity of a lid or cover confining the washer 13 on its seat and within the flange 12. The plate 18 may be carried fixedly by the valve stem 15, or may be perforated and slipped over such valve stem 15. The plate 18 takes, at its upper side, against the valve body 19. A tap or screw threaded portion 20 is formed upon the upper portion of the valve body and engages with threads, in the usual manner, upon the upper portion of the faucet casing. A handle 21 is connected to the valve body and the tap for rotating the same in opposite directions to open and close the valve.

Through the valve body 19, there is formed a bore 22 closed at its upper end, but opening downwardly through the bottom of the valve body and adapted to freely receive the upper part, and preferably the major portion of the valve stem 15, which valve stem is appropriately suspended within this bore while being capable of relative rotation with respect to the valve body 19.

In other words, the stem 15 may be maintained against any rotary movement, while, at the same time, the valve body rotates freely about such stem. Near its upper portion, the stem is formed with an annular depression or groove 23 disposed opposite a lateral socket 24, into which is flowed a body 25 of molten lead, or other appropriate material. The socket 24 opens laterally upon one side of the valve body only, such socket being closed at its other side and formed with a conical or pointed base 26, as shown in Figure 2, in order to better anchor the lead body therein.

Referring more particularly to Figure 5, a slightly different form of valve casing or diaphragm 27 is here shown, in which the valve seat 28 is shown as sloping, tapering or flaring outwardly and upwardly and terminating in a flange 29 that flares upwardly and outwardly. In this case, the plate 31 is formed with corrugations 32, or the like, in its lower face disposed against the washer 30.

In the operation of the device, Figure 1 shows the valve closed, and Figure 2, the valve in the open position, permitting the flow of water out through the nozzle 8. When the valve is moved to a closed position, the washer 13 first comes in contact with the valve seat 11 thereby setting up a constantly increasing frictional resistance to rotation, which would ordinarily be imparted to the washer if it were fixed to rotate with the tap 20.

Rotation of the washer upon the valve seat 11 tends to cut and destroy the same, but, by virtue of the connection made between the valve stem 15 and the valve body, the valve assembly is adequately supported by the body of lead 25, and at the same time, the valve tap and body is allowed to rotate freely about the valve stem 15, while such valve stem remains at rest, and while the plate 18 and the washer 13 are held against rotation by the frictional resistance resulting through contact with the valve seat 11. Through this same connection, a central pressure of the valve body upon the washer 13 will be had. In other words, the pressure will not be locally unequal, but the pressure is transmitted from the point about the narrow neck or groove 23, and thus the washer 13 can accommodate itself to its seat and seat tightly at all points about its circumference with even pressure.

It will be noted that in the closed position, the compressible washer 13 is confined by the valve seat 11, the flange 12 and the plate 18, which latter, as above referred to, forms in effect a cover for the receptacle which thus contains the washer 13. The washer thus becomes for all intents and purposes a packing and is caused to expand radially outward against the flange 12, causing an exceedingly tight joint avoiding all flow of water. At the same time, very little pressure need be put, through the screw thread 20, upon the washer for it to effect a complete seal.

Moreover, the flange 12 will confine and protect the washer 13, and will prevent same from being blown out by the water pressure. The pressure of the tap upon the washer 13, or upon the washer 30, as shown in Figure 5, will cause compressive strains to be transmitted radially inward along the compressible washer, thus tending to close the central opening 14, maintaining the tight fit of the washer about the valve stem 15 and its spear head 16, and keeping the washer always in place, while preventing the washer from sagging centrally downward into the port 10, or about the inner edge of the valve seat 11, which would tend to cut and destroy the same.

The construction thus prevents, at all times, enlargement of the hole 14 in the washer, and the washer is compressed without affecting the rubber at or about the washer hole 14. In Figure 5, this effect will be increased due to the flaring construction of the valve seat 28 and its flange 29.

Also in this Figure 5, when the washer 30 becomes unduly worn down to the backing plate 31, the grooves 32 in the latter will not form a tight seat with the valve seat 28, and thus the flow of water cannot be arrested. This flow of water and its accompanying expense will act as an incentive for the householder to rapidly renew the worn out washer. Thus the faucet will be promptly restored to good condition where there will not be any canting strains upon the threads 20 of the tap, and thus the tap will be constantly kept in good condition throughout a long life.

The valve stem 15 is preferably greased before the molten lead 25 is poured in, and as soon as such lead is poured in place, the valve stem 15 is given a slow constant rotation until the lead cools and hardens, which will prevent the lead from taking a hold upon the valve stem in such a way as would prevent the future relative movement between the valve stem and valve body.

At night, when the faucet is not in use, and when immediate attention cannot be given the same, should leakage start to occur, the construction is such that by a partial turn of the handle 21, a great compressive force may be communicated to the worn washer 13, thus causing this washer, even though worn, to close upon the valve seat, owing to its expansion against the flange 12, and prevent the flow of water until a more seasonable time for its renewal. The flange 12 will prevent the water pressure from blowing out this washer during the remainder of the night, but when the faucet is opened in the morning, the water pressure will blow such washer out, thus preventing the closing of the valve and occasioning the continued flow of water out from the nozzle 8. This flow of water and the inability to stop same will call attention to the damaged condition and result in its prompt renewal.

The narrow neck 23 on the valve stem 15 forms a pivot for the allowing of the wobbling of the valve stem 15, and valve assembly about the pivotal point supported in the lead body 25. This wobbling movement is permitted by the relatively large bore 22.

Such pivotal or wobbling movement will enable the valve washer 13 to accommodate itself all around the valve seat.

The handle 21 may be unusually small, and yet be easily manipulated, and give the desired leverage, requiring only a small application of power in order to effect a tight closing of the valve inasmuch as slight pressure will expand this valve against its seat and the flange 12.

It will be appreciated that the improved faucet provides against wear of the same during use, and requires the renewal, when expedient, of the washer in order to avoid undue wear in the faucet parts.

It will be obvious that various changes in the construction, combination and arrangement of parts could be made which could be used without departing from the spirit of my invention, and I do not mean to limit the invention to such details except as particulary pointed out in the claims.

Having thus described my invention, what I claim and desire to secure by Letters Patent of the United States is:—

1. An improved faucet comprising a valve seat, a valve body movable toward and from said valve seat, a valve stem removably mounted in said valve body and having a spear head at its lower projecting end, a backing plate on said stem below the valve body, and a compressible valve washer having an opening narrower than the spear head and adapted to be inserted over the spear head and against said backing plate.

2. An improved faucet comprising a casing having a ported diaphram with a valve seat extending about the port, and a flange rising from the outer portion of the valve seat, a valve body in the faucet movable toward and from the valve seat, a valve stem having a rotatable connection with said valve body, a compressible washer carried upon said valve stem for fitting against said valve seat and within said flange, and a plate on the valve stem for forming a cover for retaining the washer within the flange and receiving the upward compressive strains of the washer when subjected to downward pressure of the valve body.

3. An improved faucet comprising a diaphragm having a flaring valve seat and a flaring flange extending from said valve seat, a perforated compressible washer for fitting within said flange and against said valve seat, a valve stem having a shouldered head for receiving and confining said ported washer, a corrugated backing plate fitted against said washer, and a valve body for carrying said valve stem.

MIGUEL ESNARD.